(12) United States Patent
Iizuka

(10) Patent No.: US 9,354,108 B2
(45) Date of Patent: May 31, 2016

(54) ELECTRONIC BALANCE

(71) Applicant: SHIMADZU CORPORATION, Kyoto-shi, Kyoto (JP)

(72) Inventor: Atsushi Iizuka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 419 days.

(21) Appl. No.: 13/705,761

(22) Filed: Dec. 5, 2012

(65) Prior Publication Data
US 2014/0150519 A1 Jun. 5, 2014

(51) Int. Cl.
G01G 19/56 (2006.01)
G01G 23/01 (2006.01)
G01L 25/00 (2006.01)

(52) U.S. Cl.
CPC .............. *G01G 23/012* (2013.01); *G01G 23/01* (2013.01)

(58) Field of Classification Search
CPC ...... G01G 23/01; G01G 23/012; G01G 23/48
USPC .............. 73/1.13, 1.15; 177/50, 25.11, 25.12, 177/164, 25.13; 702/101, 102; 364/568, 364/567, 468, 469, 472, 478, 563, 571; 414/222, 21; 118/31.06, 83; 901/712, 901/690; 437/78, 121, 228
See application file for complete search history.

(56) References Cited

U.S. PATENT DOCUMENTS 5,052,505 A * 10/1991 Naito et al. .................... 177/229
5,058,422 A * 10/1991 Shimauchi ..................... 73/1.13
5,321,634 A * 6/1994 Obata et al. .................... 702/97
5,644,492 A * 7/1997 Reichmuth et al. ........... 705/415
2010/0228522 A1* 9/2010 Hamamoto ..................... 702/173

FOREIGN PATENT DOCUMENTS

| JP | 05-149741 | * | 6/1993 |
| JP | 08-335280 | * | 12/1996 |
| JP | 2001-099699 | * | 4/2001 |

(Continued)

OTHER PUBLICATIONS

International Union of Pure and Applied Chemistry, Compendium of Analytical Nomenclature Definitive rules 1997, Third Edition, last updated Jul. 31, 2002 by David Moore.*

(Continued)

*Primary Examiner* — Hezron E Williams
*Assistant Examiner* — Truong Phan
(74) *Attorney, Agent, or Firm* — Sughrue Mion, PLLC

(57) ABSTRACT

The electronic balance has a load detector for supporting a scale pan and outputting the load value of a load placed on the scale pan. A weight change calculating program calculates changes in the weight of a sample to be measured based on sample load measurement values ouput from the load detector when the sample is placed on the scale pan at two different points in time and load-free measurement values output from the load detector in the load-free state before and after the respective sample load measurements values are output. Also, minute changes in the weight of a light-weight sample are measured accurately since the load-free weight is measured before and after sample measurements even if the sensitivity or zero drift changes due to changes in the environment conditions, and the sample weight is further corrected using measurements of the load of a reference weight.

6 Claims, 5 Drawing Sheets

(56) References Cited

FOREIGN PATENT DOCUMENTS

| | | | |
|---|---|---|---|
| JP | 2001-099699 A | | 4/2001 |
| JP | 2002-098579 | * | 4/2002 |
| JP | 2002-098579 A | | 4/2002 |

OTHER PUBLICATIONS

Japanese Office Action mailed on Sep. 17, 2013 in Japanese Patent Application No. 2010-143384.

* cited by examiner

ELECTRONIC BALANCE

TECHNICAL FIELD

The present invention relates to an electronic balance.

BACKGROUND ART

In order to maintain high precision in electronic balances having high measurement precision such as electromagnetic balance-type electronic balances, it is necessary to strictly correct changes in the environment in particular, changes in sensitivity or zero drift due to temperature and various methods for reducing changes in sensitivity or zero drift in these electronic balances have been proposed (for example, see Patent Literature 1). In addition, a commonly used method is one in which a counterweight for calibration is built into the device and a built-in counterweight addition and removal mechanism for adding and removing the built-in counterweight into and from the load measuring mechanism is provided to accommodate fluctuations in sensitivity or zero drift depending on the timing of use, wherein calibration is performed as necessary by the user or automatically using the built-in counterweight when there is a certain amount of change in temperature (for example, see Patent Literature 2).

PRIOR ART LITERATURES

Patent literature 1) Japanese Unexamined Patent Application Publication 2001-99699
Patent literature 2) Japanese Unexamined Patent Application Publication 2002-98579

SUMMARY OF THE INVENTION

In the electronic balances described above, there is an increasing need from the perspective of emphasis on quality evaluation to capture and accurately measure minute changes in weight of 1 mg or lower in a comparatively lightweight sample of approximately several 10s of mg as property changes for example, the need to monitor changes in the amount of water absorption or the amount of evaporation of plastic over time in response to changes in the environment such as temperature or humidity or to measure the amount of change in weight before and after performing surface treatment such as coating application to a sample.

However, even if the load measuring mechanism performs the calibration described above, the degree of change in sensitivity or the amount of zero drift from the time of calibration differs depending on the ambient temperature or humidity of the electronic balance. Even if the degree of error is not problematic for ordinary measurements, the ratio of sensitivity or the amount of zero drift with respect to changes in weight becomes non-negligible when measuring changes in weight.

For example, when a sample weighing 1 g is weighed twice at different points in time, zero drift levels of 0.5 mg and 0.4 mg yield errors of only 0.5% and 0.4%, respectively, which is within the range of permissible error for ordinary measurements. However, when calculating changes in weight, the difference in the amounts of zero drift becomes 0.1 mg, and assuming that the change in the weight of the sample is approximately 1 mg, the error reaches as high as 10%.

In particular, the ambient temperature and humidity of an electronic balance vary dramatically in the summer and winter, which demonstrate large differences in air temperature in the climate of Japan, or between nighttime when air conditioning is not running and daytime when measurements are taken after resuming air conditioning. Under such conditions, there is the problem that the amounts of change in sensitivity and zero drift greatly affect the measurement of minute changes in the weight of a sample depending on the time when the measurement is made.

In order to solve the problem described above, the present invention is equipped with: a scale pan; and a load detector for supporting the scale pan and outputting the load value of a load placed on the scale pan; wherein the electronic balance has a weight change calculating means for calculating changes in the weight of a sample to be measured based on: (a) sample load measurement values outputted from the load detector when the sample is placed on the scale pan at two different points in time; and (b) load-free measurement values outputted from the load detector in the load-free state before and after the respective sample load measurement values are outputted.

In addition, the weight change calculation means of the present invention may calculate changes in the weight of the sample based on: (b1) reference weight load measurement values outputted from the load detector when a reference weight is placed on the scale pan before and/or after the respective sample load measurement values are outputted; and (b2) load-free measurement values outputted from the load detector in the load-free state before and after the sample load measurement values and the reference weight load measurement values are outputted.

In addition, the invention may further have a measurement timing notification means for notifying an operator of the timing of the addition and removal of the sample and the reference weight, and it is even more preferable for the measurement timing notification means to be based on a display or a display and a voice on the electronic balance itself.

Even if the sensitivity or zero drift changes due to changes in the environmental conditions such as the ambient temperature or humidity of the electronic balance, the load-free weight is measured before and after sample measurements, and the sample weight is further corrected using measurements of the load of a reference weight, so minute changes in the weight of a sample of 1 mg or lower can be measured accurately.

EXEMPLARY EMBODIMENTS OF THE INVENTION

Figure 1:
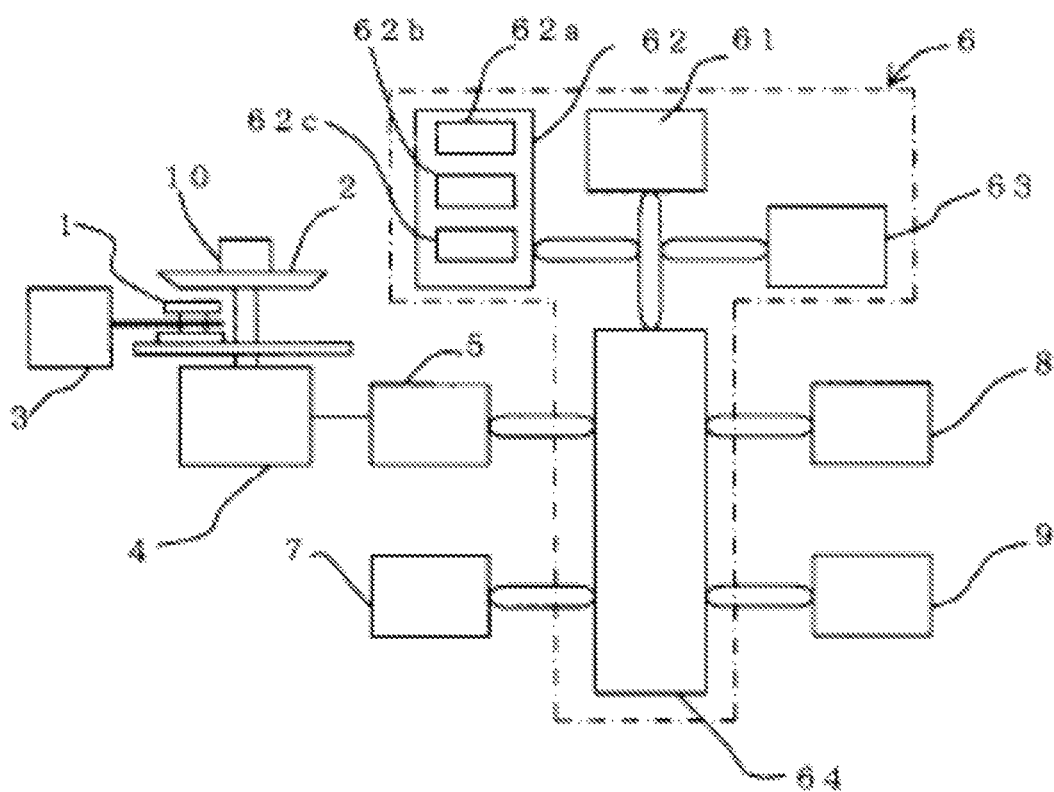
FIG. 1 is a block diagram showing the configuration of the electronic balance of the present invention.

Embodiments of the electronic balance of the present invention will be described hereinafter with reference to the drawings. FIG. 1 is a block diagram showing the configuration of an embodiment of the present invention. This electronic balance comprises a counterweight addition and removal mechanism 3 for loading a built-in counterweight 1 onto a scale pan 2 at the time of calibration, a load detector 4 for detecting a load which is loaded from the scale pan 2, an A/D converter 5 for converting an analog signal detected by the load detector 4 into a digital signal, an operation control part 6 for performing operations to capture and convert this digital signal into measurement time or weight change amount data to be outputted to a display 7 for displaying the data, a printer 8, or the like and transmitting a control signal to the counterweight addition and removal mechanism 3, a keyboard 9 for switching the display of menus used for turning the power ON/OFF, setting weighing units, calibrating sensitivity with the built-in counterweight 1, and measuring changes in weight, and a plurality of reference weights 10 of different weights which are similar to a sample for which changes in weight are measured and maintain constant weights with respect to changes in temperature or humidity.

The operation control part 6 consists of a microcomputer as its main unit and comprises a CPU 61 for performing operation control processing in sync with the clock frequency of a built-in transmitter, a ROM 62, which stores the operation control programs, having a measurement load storage program 62a for storing the load measurement values of a reference weight and a sample measured before and after certain points in time and the load-free measurement values measured at equal times before and after the load measurements, a sensitivity correction coefficient calculation program 62b for calculating a sensitivity correction coefficient from the load measurement values and the load-free measurement values of the reference weight, and a sample weight change calculation program 62c for calculating changes in sample weight using the sensitivity correction coefficient, a RAM 63 for storing weighing data or operation parameters, and an I/O interface 64.

Figure 2:
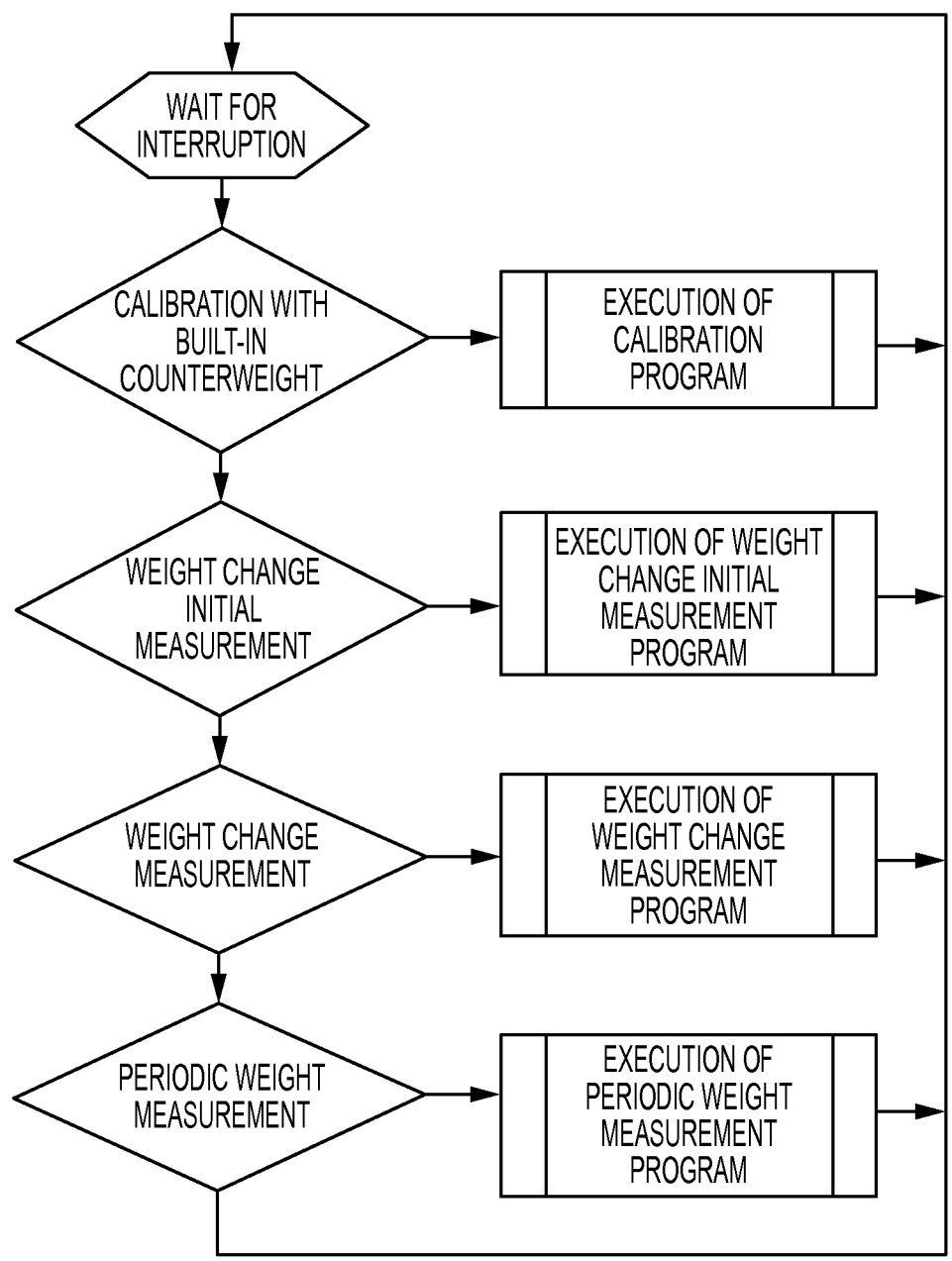
FIG. 2 is a flowchart showing the main routine of operation control programs of an embodiment.
Figure 3:
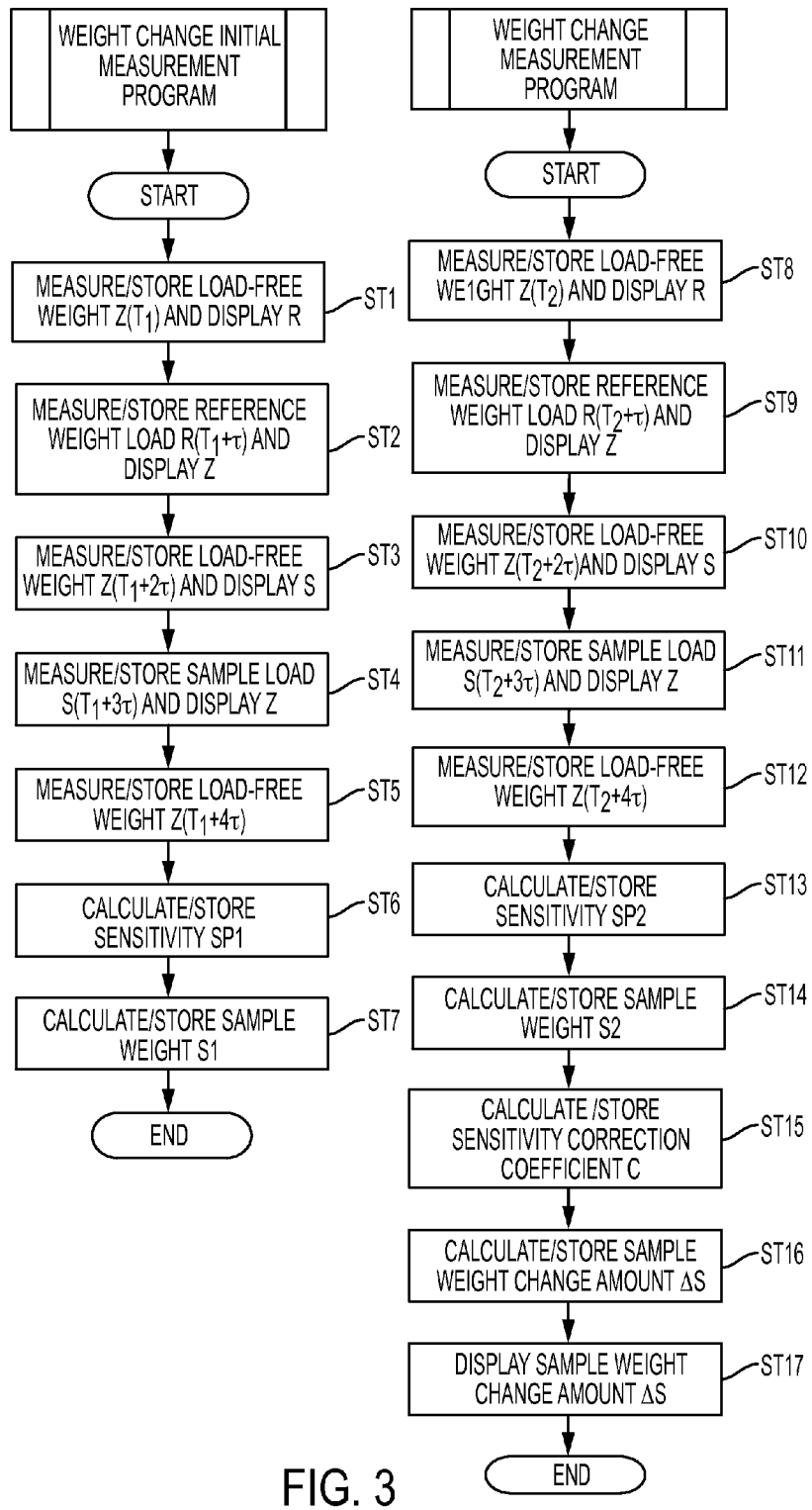
FIG. 3 is a flowchart showing the procedure for measuring changes in weight in the operation control programs of the embodiment.

FIGS. 2 and 3 are flowcharts showing a summary of the operation control programs stored in the ROM 62. The operation of this embodiment will be described hereinafter with reference to these drawings. The CPU 61 in FIG. 1 normally executes a program which scans for the receipt of each interruption signal of a main routine such as that shown in FIG. 2. This interruption signal may be a calibration start signal based from the built-in counterweight 1 transmitted by a key operation of the keyboard 9, a weight change initial measurement start signal when a change in the weight of a sample is to be measured, a second or subsequent weight change measurement start signal, or a weight measurement start signal which is obtained by counting the pulse signals of the clock frequency generated by the operation control part 6 and is transmitted periodically.

When the CPU 61 catches an interruption signal while scanning the main routine described above, the CPU 61 distinguishes the type of the interruption signal, performs the corresponding interruption processing, and then returns to the main routine work. For example, if a calibration signal is transmitted by a key operation of the keyboard 9, the addition or removal of the built-in counterweight 1 to or from the load detector 4 is automatically executed to calibrate the sensitivity correction coefficient. If a weight change initial measurement start signal or a weight change measurement start signal is transmitted by a key operation of the keyboard 9, the weight change measurement program shown in FIG. 3 is executed.

Figure 4:
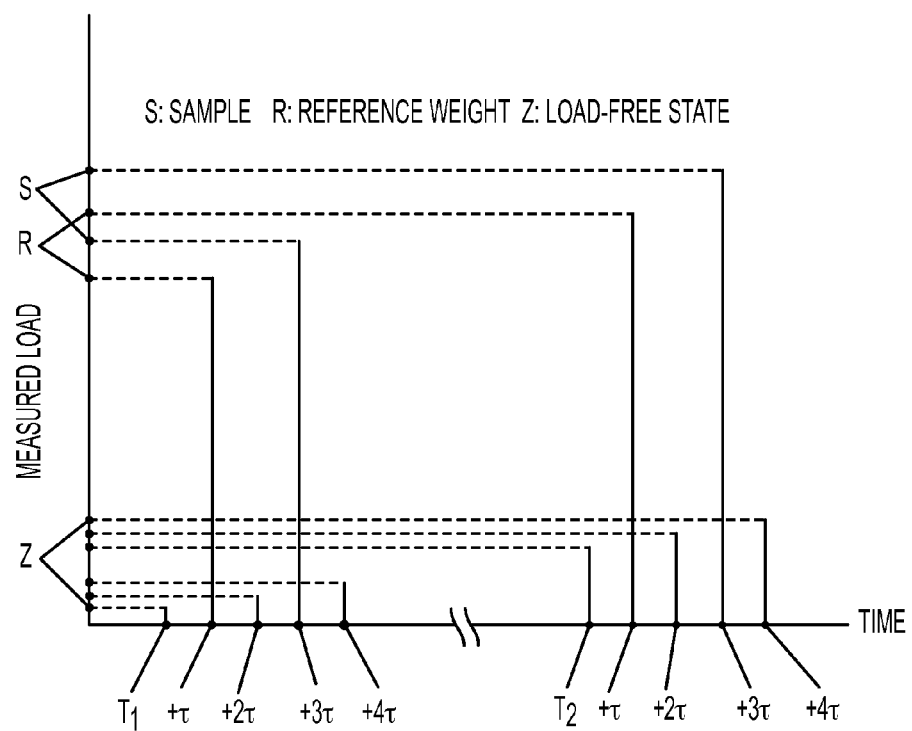
FIG. 4 is a graph showing the relationship between the measurement target and the measurement time when measuring changes in weight with the electronic balance of the present invention.

In a state in which no object is placed on the balance (load-free state), an ID symbol for identifying a sample for which weight changes are to be measured is registered with the keyboard 9, and the weight of a reference weight having the corresponding weight, a weight change initial measurement time $T_1$, and a measurement interval time $\tau$ are set. When a command to perform a weight change initial measurement is given, the weight change initial measurement program is activated, and a load-free weight $Z(T_1)$ at a time $T_1$—that is, the zero point—is measured by the load detector 4, as shown in FIG. 4. This measurement value and the ID symbol are stored in the RAM 63, and a symbol R instructing the placement of the reference weight 10 on the scale pan 2 is displayed in a blinking manner on the display 7 (ST1). A measurement time interval $\tau$ of 30 seconds is ordinarily used.

When the reference weight 10 is placed on the scale pan 2 based on this command, the reference weight load $R(T_1+\tau)$ at a time $(T_1+\tau)$ when the weight is loaded onto the load detector 4 $\tau$ hours after the measurement start time $T_1$ is measured. The measurement value and the ID symbol are stored in the RAM 63, and the user is notified of the symbol Z ordering the load-free state by a blinking display or a blinking display and the generation of a voice (ST2).

When the reference weight 10 is removed, the load-free weight $Z(T_1+2T)$ of the balance $2\tau$ hours after the measurement start time $T_1$ is measured. This measurement value and the ID symbol are stored in the RAM 63, and a symbol S instructing the placement of the sample on the scale pan 2 is displayed in a blinking manner (ST3).

When the sample is placed on the balance based on this command, the sample load $S(T_1+3\tau)$ of the sample $3\tau$ hours after the measurement start time $T_1$ is measured. This measurement value and the ID symbol are stored in the RAM 63, and a symbol Z instructing the load-free state is displayed in a blinking manner (ST4).

When the sample is removed, the load-free weight $Z(T1+4T)$ of the balance $4\tau$ hours after the measurement start time $T_1$ is measured. This measurement value and an ID symbol are stored in the RAM 63 (ST5), and the sensitivity SP1 is calculated from formula (1) and stored (ST6). The sample weight S1 is calculated from formula (2) and stored, and the weight change initial measurement ends (ST7).

$$SP1 = R(T_1+\tau) - ((Z(T_1)+Z(T_1+2\tau))/2 \quad (1)$$

$$S1 = S(T_1+3\tau) - ((Z(T_1+2\tau)+Z(T_1+4\tau))/2 \quad (2)$$

Next, when the ID symbol of the sample and a measurement start time $T_2$ are set with the keyboard 9 and a command is given to start the weight change measurement in the load-free state at a prescribed time $T_2$, the weight change calculation program is activated, and, as shown in FIG. 4, the load-free weight $Z(T_2)$ loaded on the load detector 4 at time $T_2$ is measured. The measurement value and the ID symbol are stored in the RAM 63, and a symbol R is displayed in a blinking manner (ST8).

When the reference weight 10 is placed on the scale pan 2 based on this command, the reference weight load $R(T_2+\tau)$ at a time $(T_2+\tau)$ when the weight is loaded onto the load detector 4 $\tau$ hours after the measurement start time $T_2$ is measured. The measurement value and the ID symbol are stored in the RAM 63, and the symbol Z is displayed in a blinking manner (ST9).

When the reference weight 10 is removed, the load-free weight $Z(T_2+2\tau)$ of the balance $2\tau$ hours after the measurement start time $T_2$ is measured. This measurement value and the ID symbol are stored in the RAM 63, and a symbol S instructing the placement of the sample on the scale pan 2 is displayed in a blinking manner (ST10).

When the sample is placed on the balance based on this command, the sample load $S(T_2+3\tau)$ loaded on the load detector 4 in the state in which the sample is placed on the balance $3\tau$ hours after the measurement start time $T_2$ is measured. This measurement value and the ID symbol are stored in the RAM 63, and the symbol Z is displayed in a blinking manner (ST11).

When the sample is removed, the load-free weight $Z(T_2+4\tau)$ of the balance $4\tau$ hours after the measurement start time $T_2$ is measured, and this measurement value and the ID symbol are stored in the RAM 63 (ST12). The sensitivity SP2 represented by the weight of the reference weight 10 is calculated from formula (3) and stored (ST13), and the sample weight S2 is calculated from formula (4) and stored (ST14).

$$SP2=R(T_2+\tau)-((Z(T_2)+Z(T_2+2\tau))/2 \qquad (3)$$

$$S2=S(T_2+3\tau)-((Z(T_2+2\tau)+Z(T_2+\tau))/2 \qquad (4)$$

Next, the sensitivity correction coefficient C is calculated from formula (5) and stored (ST15), and the sample weight change amount $\Delta S$ is calculated from formula (6) and stored (ST16). The sample weight change amount $\Delta S$ is displayed on the display 7 (ST17).

$$C=SP1/SP2 \qquad (5)$$

$$\Delta S=C\cdot S2-S1 \qquad (6)$$

The weight change amount $\Delta S$ before and after the sample is subjected to surface treatment such as coating is calculated from formula (6). When changes in the weight of a sample due to changes in environment are monitored multiple times, multiple weight change measurements are performed at constant time intervals. When the sensitivity at the nth (n>2) measurement time $T_n$ is defined as SPn and the sample weight is defined as Sn, the sensitivity correction coefficient Cn is calculated from formula (7), and the weight change amount $\Delta Sn$ is calculated from formula (8).

$$Cn=SP1/SPn \qquad (7)$$

$$\Delta Sn=Cn\cdot Sn-S1 \qquad (8)$$

Minute weight changes in the sample are calculated using formulas (7) and (8) to successively calculate the weight change amount $\Delta S$ between each of the measurement points, and this is displayed in a graph as a broken line so that changes in the weight of the sample can be continuously understood.

Ordinary sensitivity correction is performed by weighing the reference weight with a known weight, calculating and storing the ratio of the true weight value and the measurement value, and multiplying the stored ratio by the measurement value of the sample. In this embodiment, it is assumed that the sensitivity correction coefficient is stored independently from the first sample weight S1, which is effective in that sensitivity calibration is possible even if the weight of the reference weight is not known.

Figure 5:
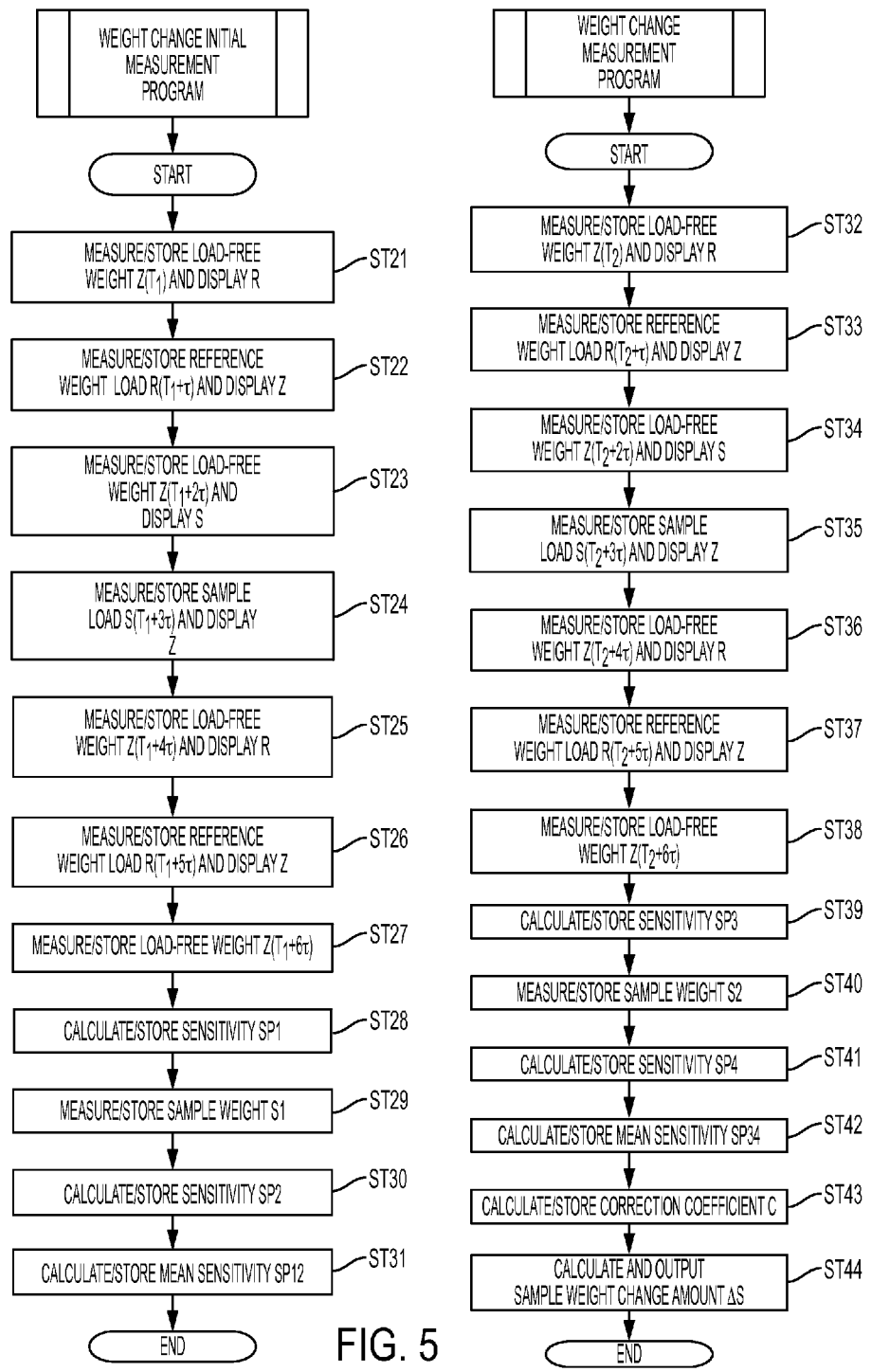
FIG. 5 is a flowchart showing the procedure for measuring changes in weight in operation control programs of another embodiment.

FIG. 5 is a flowchart showing the sample weight change calculation program 62c of the electronic balance of another embodiment, which comprises a weight change initial measurement program and a weight change measurement program, wherein the precision of sensitivity correction is improved by increasing the measurement of the reference weight load to two measurements.

The operation will be described hereinafter with reference to FIG. 5. When a command is given to perform the weight change initial measurement, the load-free weight $Z(T_1)$ is measured and stored at time $(T_1)$, the reference weight load $R(T_1+\tau)$ is measured and stored at time $(T_1+\tau)$, the load-free weight $Z(T_1+2\tau)$ is measured and stored at time $(T_1,2\tau)$, the sample load $S(T_1+3T)$ is measured and stored at time $(T_1+3T)$, the load-free weight $Z(T_1+4T)$ is measured and stored at time $(T_1+4\tau)$, the reference weight load $R(T_1+5\tau)$ is measured and stored at time $(T_1+5\tau)$, and the load-free weight $Z(T_1+6\tau)$ is measured and stored at time $(T_1+6\tau)$ in accordance with Embodiment 1 (ST21 to ST27).

Next, the sensitivity SP1, the sample weight S1, the sensitivity SP2, and the mean sensitivity SP12 are calculated from formulas (1), (2), (9), and (10), respectively, and stored (ST28 to ST31).

$$SP2=R(T_1+5\tau)-(Z(T_1+4\tau)+Z(T_1+6\tau))/2 \qquad (9)$$

$$SP12=(SP1+SP2)/2 \qquad (10)$$

When the weight change measurement is instructed, the load-free weight $Z(T_2)$ is measured and stored at time $(T_2)$, the reference weight load $R(T_2+\tau)$ is measured and stored at time $(T_2+\tau)$, the load-free weight $Z(T_2+2\tau)$ is measured and stored at time $(T_2+2\tau)$, the sample load $S(T_2+3\tau)$ is measured and stored at time $(T_2+3\tau)$, the load-free weight $Z(T_2+4\tau)$ is measured and stored at time $(T_2+4\tau)$, the reference weight load $R(T_2+5\tau)$ is measured and stored at time $(T_2+5\tau)$, and the load-free weight $Z(T_2+6\tau)$ is measured and stored at time $(T_2+6\tau)$ (ST32 to ST38).

Next, the sensitivity SP3, the sample weight S2, the sensitivity SP4, the mean sensitivity SP34, and the correction coefficient C are calculated from formulas (11), (12), (13), (14), and (15), respectively, and stored, and the sample weight change amount $\Delta S$ is calculated from formula (16) and stored (ST39 to ST44).

$$SP3=R(T_2+\tau)-(Z(T_2)+Z(T_2+2\tau))/2 \qquad (11)$$

$$S2=S(T_2+3\tau)-(Z(T_2+2\tau)+Z(T_2+4\tau))/2 \qquad (12)$$

$$SP4=R(T_2+5\tau)-(Z(T_2+4\tau)+Z(T_2+6\tau)/2 \qquad (13)$$

$$SP34=(SP3+SP4)/2 \qquad (14)$$

$$C=SP12/SP34 \qquad (15)$$

$$\Delta S=C\cdot S2-S1 \qquad (16)$$

The sample weight change calculation program 62c shown in FIGS. 3 and 5 may also be combined with the weight change initial measurement program and the weight change measurement program so that the weight change initial measurement is started at time $T_1$ and the weight change measurement is then performed at time $T_2$.

In the embodiment described above, unit mean values were obtained in formulas (1) to (4) and (9) to (14) by calculating the loads S, R, and Z at equal time intervals, but if the time intervals are arbitrary, it is necessary to use weighted mean values corresponding to the time intervals rather than unit mean values.

In addition, in the embodiment described above, the operator was notified of the sample addition and removal timing, but the load signal of the sample and the load signal in the load-free state may also be measured at a timing designated by the operator with a switch or the like. In this case, the time interval of each measurement is not constant, so it is necessary to use weighted mean values corresponding to the time intervals rather than unit mean values in each of the formulas, as described above. In addition, the measurement triggers can be variously modified as long as the load S is measured at different times and the loads R and Z are measured before and after each of these points in time.

Further, a built-in counterweight was used as the reference weight above, but the counterweight may also be added and removed manually by the operator. In this case, the operator may be notified of the counterweight addition and removal timing, and the operator may measure the load of the reference weight at a timing entered with a switch or the like after the counterweight is added or removed.

As a counterweight, it is desirable to use an object with a weight similar to the sample to be measured, and when changes in the weight of a sample are to be measured before and after surface treatment or the like, it is preferable to use the same type of sample which has not been subjected to surface treatment or the like as a reference weight. This is because it is desirable to calibrate the sensitivity in the vicinity of the sample weight since the sensitivity is not necessarily linear.

In the embodiment described above, load measurements were performed sequentially at two different points in time for Z, R, Z, S, Z, R, and Z, respectively, but the reference weight measurement may be performed only after the sample measurement in the order Z, S, Z, R, and Z or only before the sample measurement in the order Z, R, Z, S, and Z. Further, the measurement of R may be omitted when the effects of the sensitivity are of a degree that cannot be ignored in comparison to the effects of zero drift.

EXPLANATION OF REFERENCES 1 built-in counterweight
2 scale pan
3 counterweight addition and removal mechanism
4 load detector
5 A/D converter
6 operation control part
61 CPU
62 ROM
62a measurement load storage program
62b sensitivity correction coefficient calculation program
62c sample weight change calculation program
63 RAM
64 I/O interface
7 display
8 printer
9 keyboard
10 reference weight

What is claimed is:
1. An electronic balance, comprising:
a scale pan;
a load detector for supporting said scale pan and outputting the load value of a load placed on said scale pan; and
a weight change calculator configured to calculate changes in the weight of a sample to be measured based on:
sample load measurement values outputted from said load detector when said sample is placed on said scale pan at two different points in time;
reference weight load measurement values outputted from said load detector when a reference weight is placed on said scale pan before and after said respective sample load measurement values are outputted; and
load-free measurement values outputted from said load detector in the load-free state before and after each of said sample load measurement values is outputted and before and after each of said reference weight load measurement values is outputted.

2. An electronic balance according to claim 1 further having a measurement timing notification configured to notify an operator of the timing of the addition and removal of said sample and said reference weight.

3. An electronic balance according to claim 2, wherein said measurement timing notification is a display or a display and a voice on the electronic balance itself.

4. A method of calculating a weight change, comprising:
outputting a load value of a load placed on a scale pan by a load detector; and
calculating changes in the weight of a sample to be measured based on:
sample load measurement values outputted from said load detector when said sample is placed on said scale pan at two different points in time;
reference weight load measurement values outputted from said load detector when a reference weight is placed on said scale pan before and after said respective sample load measurement values are outputted; and load-free measurement values outputted from said load detector in the load-free state before and after each of said sample load measurement values is outputted and before and after each of said reference weight load measurement, values is outputted.

5. The method of calculating a weight change according to claim 4, further comprising notifying an operator of the timing of the addition and removal of said sample and said reference weight.

6. An electronic balance according to claim 5, wherein said measurement timing is notified by a display or a display and a voice on the electronic balance itself.

* * * * *